United States Patent [19]

Bond

[11] Patent Number: 4,606,848

[45] Date of Patent: Aug. 19, 1986

[54] RADAR ATTENUATING PAINT

[75] Inventor: John W. Bond, Dana Point, Calif.

[73] Assignee: The United States of America as represented by the Secretary of the Army, Washington, D.C.

[21] Appl. No.: 640,630

[22] Filed: Aug. 14, 1984

[51] Int. Cl.$^4$ .............................................. H01B 1/06
[52] U.S. Cl. .................................. 252/511; 252/512; 252/513; 252/502; 524/495; 524/496; 524/439; 524/440; 523/457; 523/458; 523/459; 523/468; 343/18 A
[58] Field of Search ............... 252/502, 511, 512, 513, 252/501.1; 524/439, 440, , 495, 496; 523/457–459; 343/18 A, 18 B; 106/1.05

[56] References Cited

U.S. PATENT DOCUMENTS

| | | | |
|---|---|---|---|
| 2,418,479 | 4/1947 | Pratt et al. | 117/64 |
| 2,610,250 | 9/1952 | Wheeler | 178/44 |
| 2,918,671 | 12/1959 | Halpern | 343/18 |
| 2,954,552 | 9/1960 | Halpern | 343/18 |
| 2,996,709 | 8/1961 | Pratt | 343/18 |
| 3,185,986 | 5/1965 | McCaughna et al. | 343/18 |
| 3,187,331 | 6/1965 | Beller | 343/18 |
| 3,662,387 | 5/1972 | Grimes | 343/18 A |
| 3,773,684 | 11/1973 | Marks | 343/18 A |
| 4,003,840 | 1/1977 | Ishino et al. | 252/62 |
| 4,006,479 | 2/1977 | LaCombe | 343/18 A |
| 4,012,738 | 3/1977 | Wright | 343/18 A |
| 4,034,375 | 7/1977 | Wallin | 343/18 A |
| 4,047,174 | 9/1977 | Wohlers | 343/18 B |
| 4,162,496 | 7/1979 | Downen et al. | 343/18 A |
| 4,173,018 | 10/1979 | Dawson et al. | 343/18 A |

*Primary Examiner*—Josephine L. Barr
*Attorney, Agent, or Firm*—Roger F. Phillips; John E. Becker; Anthony T. Lane

[57] ABSTRACT

A radar attenuating composition is described for which incident microwave radiation is absorbed and/or scattered, causing a significant decrease in retroreflectance of the object to which the composition is applied, that is, a reduction in the radar cross-section of the object. The radar attenuating composition or paint is prepared by uniformly mixing thin conducting fibers such as stainless steel fibers or carbon or graphite into a standard camouflage-type paint. The fibers act as electric dipole segments. The purpose of the countermeasure paint of the present invention is to reduce the amount of microwave radiation reflected back by a target to the receiver, i.e. reducing the amount of retroreflection.

9 Claims, No Drawings

RADAR ATTENUATING PAINT

GOVERNMENT INTEREST

The invention described herein may be manufactured, used, and licensed by or for the U.S. Government for government purposes without payment to me of any royalties thereon.

BACKGROUND OF THE INVENTION

The present invention relates to a radar attenuating composition, and more specifically, to a paint material to be used on the surfaces of military targets for the purpose of protecting them from being detected, located and/or recognized by radar over a broad radiation spectrum.

Radiation over a broad spectrum may be used to detect, locate, or to recognize targets of a military importance. Microwave radiation over a wide spectrum from 5 to 18 GHz and at 35±1 GHz has been used for long-range surveillance to detect, locate and recognize military targets at distances of from a few to hundreds of kilometers. This application is referred to as surveillance radar.

The reason for the absence of frequencies between 18 and 34 GHz is due to atmospheric absorption. Although most of the radiation is absorbed by the atmosphere in this range, a sufficient amount travels small distances that is, less than 1 kilometer, so that it can be used as seeker or guidance radar. At radar frequencies higher than about 36 GHz, the microwave radiation is absorbed at relatively short distances in the atmosphere except at specific frequencies of 94±1 GHz, 140±1 GHz, and 220±1 GHz. Seeker or guidance radar systems at these frequencies are generally missile borne to guide missiles to their targets. Seeker systems at other frequencies above 18 GHz are also used in conjunction with longer range surveillance or acquisition radar systems to guide missiles to selected targets.

Radiation originating from natural sources, such as the sun, may be reflected from a target or absorbed by the target and readmitted to be detected by a sensor sensitive to the reflected radiation of a known wavelength. Artificially produced electromagnetic radiation may be also generated and scanned across a field to be reflected by targets of interest. The more important types of radiation include acoustic, ultraviolet, visual, near infrared, thermal infrared, millimeter wave, radar, and laser. Of the above, ultraviolet, visual, near infrared, and laser radiation are typically reflected by the target to be sensed by a suitable sensor. By contrast, thermal infrared radiation is emitted from a target which has a surface temperature greater than that of its surroundings. Such targets typically take the form of a motor vehicle having an internal combustion engine. In addition, thermal infrared radiation may be generated by solar surface heating, and by friction as would result from the movement of tank treads or from the use of electric power. Sensors that are adapted to sense thermal infrared radiation also are capable of sensing extra-terrestrial or space radiation that is reflected by the target, typically at night. Another band of radiation of interest is millimeter wave radiation typically generated and directed towards targets. The millimeter wave radiation is reflected back from the target and is received by missile borne sensors to provide a reflected radiation signal for homing the missile toward the target. Similarly, radar radiation is generated by an airborne radar system to detect targets, the reflected radar radiation from the target being used to detect the presence or location and to identify the target.

Until very recently, radar frequencies greater than about 30 GHz were not used for military applications. Various types of countermeasures have been developed and used to void radar frequencies generally below about 18 GHz such as the use of radar absorbing material that absorbs incident radar. The utilization of heretofore radar absorbing materials has generally required thick applications of the respective materials which makes for bulkiness and difficulty in transportation or deployment. Their use generally resulted in degradation of the effected systems mobility. In the category of the radar absorbing material, is a radar absorbing paint which relies upon the absorption of incident microwaves by the use of materials such as ferrites. However, the use of these materials has also been encumbered by the disadvantages of the weight and thickness requirements. In addition, materials that completely absorb radar do not simulate the natural background which absorbs and scatters. When used on a ground target and observed by an airborne sensor, the target will appear as a "black hole".

For example, U.S. Pat. No. 4,173,018, Dawson et al, discloses a mixture for the attenuation of electromagnetic wave frequency as an anti-radar means using finely divided diameter of from 0.5 to 20 microns in an insulating binder wherein the mixture can be applied by painting or spraying. The mixture is effective generally for attenuating electromagnetic wave energy in the frequency range of from 2 to 10 GHz by the application of approximately a 0.04 inch thick coating. The particles used comprise approximately 90% of the weight of the mixture. U.S. Pat. Nos. 2,918,671 and 2,954,552 to Halpern, disclose coating propeller blades for absorbing incident microwave radiation at pre-selected wave lengths comprising finely divided particles such as aluminum graphite, copper and the like, dispersed substantially insulated from each other in a neutral binder such as waxes, resins, rubbers, and the like and protective layers for absorbing incident radio microwave radiation comprising ferro-magnetic flake-like particles such as steel dispersed quasi-insulated in a binder. U.S. Pat. No. 3,185,986, McCaughna et al, disclose a mixture of ferromagnetic materials which can be utilized to shield objects from detection by radar by applying the mixture as a coating to a base member by painting or spraying. U.S. Pat. No. 3,662,387, Grimes, discloses a radio microwave radiation absorbent layer containing ferrite material. U.S. Pat. Nos. 2,996,709 and 2,418,479, to Pratt, relate to the use of flexible electromagnetic radiation absorbent materials including thin metallic flakes such as ferro-magnetic flakes in paint films. U.S. Pat. No. 4,034,375, Wallin, discloses a laminated camouflage material including electrically conductive fibers such as stainless steel or graphite lying in a plane essentially parallel to a first overcoated layer and a second undercoating layer comprising non-woven flexible fibers with electrically non-conductive polymeric material.

Although the above applications of radar absorbing material have been found useful, there are, as mentioned generally disadvantages in their uses. As discussed above, the use of heretofore known radar attenuating devices have been specifically applied in the complete absorption of incident microwaves and, in the process, required to be used in amounts at least equal to 20 to 25% and generally greater so as to represent the greatest concentration or weight of components present in the resulting composition. Typically, the use of the ferrite materials will exceed 50% of the binder or carrier with which it is combined. Thus, the resulting radar absorbing composition, such as radar absorbing paint, will be extremely heavy as a result of the concentration of additive and thickness at which the composition is applied. Furthermore, they have been known to be particularly effective at frequency ranges much lower than that necessary and primarily useful in the absorption of microwave radiation, to the exclusion of sometimes desirable combinations of absorption and reflection of the incident radiation for purposes of camouflage.

Other methods have been suggested to defeat the effect of radar, such as in the use of decoys and clutter. Decoys are designed to have the same radar cross-sections as the real target and generally their cost factors have been far too high for most applications. Clutter generally consists of smaller corner reflectors that have large radar cross-sections. They have been used for military purposes as countermeasure means against radar detection by being dropped from an aircraft to provide a reflector for the radar waves which create a false echo, that is, an echo which is not emitted from the target. However, this type of application has generally been easily overcome by the use of moving target radar indicators and in the case of the use of clutter in the form of chaff dispersed in the atmosphere, the attenuating effect is very transient due to the fact that the individual chaff elements or dipoles separate from each other by wind and/or other atmospheric effects thus providing only a very temporary effect. When they are separated by more than two radar wavelengths, the chaff attenuation of the radar is no longer effective.

SUMMARY OF THE INVENTION

Therefore, it is an objective of the present invention to provide a radar attenuating device which will overcome the above and other disadvantages.

A further objective of the present invention is to provide a radar attenuating material which is capable of both absorbing and scattering incident microwave radiation over a wide spectrum.

Yet, a further objective of the present invention is to provide a radar attenuating composition to be used on the surface of military targets for the purposes of protecting them from being detected, located, recognized, and/or indentified by radar at frequencies greater than about 5 GHz.

Still a further objective of the present invention is to provide a radar attenuating material which is effective over ranges greater than about 2 kilometers.

Another objective of the present invention is to provide a radar attenuating vehicle in the form of a paint composition to be used on the surfaces of military targets such that the thickness and overall weight of the composition is such so as not to have a detrimental effect upon the function of the device to which it is applied.

Still another objective of the present invention is to provide a method of protecting a military target from surveillance acquisition and missile guidance or homing by enemy radar through the application of a radar attenuating paint composition which is capable of protecting the object from recognition by radar over a wide spectrum of microwave radiation at distances of a few to hundreds of kilometers.

Another objective of the invention is to mix a small amount of the attenuating material with standard camouflage paint (<5% by vol.) or coatings so that the new paint will have the desired radar attenuating characteristics while retaining visual characteristics. The coatings would be used on non-metallic surface such as camouflage cloth or nets.

The foregoing objectives and others are accomplished in accordance with the present invention generally speaking by providing a radar attenuating composition, such as radar attenuating paint, wherein incident microwave radiation is absorbed and/or scattered resulting in a significant decrease in the retroreflectance, i.e., there is a substantial reduction in the radar cross section. When used in the course of the present invention, the term "radar" refers to all frequencies between 1 and 300 GHz. The radar attenuating composition or paint of the present invention comprises conducting fibers, such as stainless steel fibers and/or carbon or graphite fibers, mixed with a standard camouflage-type paint. The fibers represent electric dipole segments such that the electro-magnetic fields induced by interacting microwave radiation interact coherently to result in absorption and scattering of the incident radar. The conductive fibers are present at a length of from about 0.001 cm ($10\mu$) to 3 cm ($3\times 10^4\mu$) with a preferred length of from about 0.1 cm ($10^3\mu$) to about 1.0 cm ($1.0^4\mu$). The diameter of the fiber will range from about $1\times 10^{-6}$ cm ($0.01\mu$) to $3\times 10^{-3}$ cm ($30\mu$) with a preferred diameter ranging from $1\times 10^{-4}$ cm ($1\mu$) to $15\times 10^{-4}$ cm ($15\mu$). As stated, the fibers are electric dipole segments; if they are used at the same lengths, the frequency bands for attenuation may be relatively narrow. Therefore, it is preferred that the lengths of the conducting fibers added to the paint composition vary so that the effective band width can be relatively broadened. The optimum attenuated radar frequency may depend on the average length of the segments and the effective band width corresponds to the distribution of the segment lengths. Said conducting fibers will generally be present in an amount ranging from 0.1 to 10.0% of the total weight of the radar attenuating composition with a preferred range of from about 1 to 5%, with the quantity depending on the radar frequency, the effective band width, and the required attenuation. The dipole segments in the paint composition will be spaced from a small fraction of a radiation wavelength to several wavelengths apart. This spatial arrangement will be affected somewhat by the ratio or weight percentage selected. Carbon or graphite filaments significantly vary by type in electrical resistivity, and radar attenuation has been identified as having a positive dependence on resistivity. Thus, carbon or graphite filaments of relatively high resistivity are preferred. The radar attenuating paint/coating may be placed on a dielectric substrate such as canvas, clothing (a soldier's uniform), plastic material or camouflage netting. The separation distance between a conductive substrate and the radar attenuating paint layer will affect the resulting attenuation. In the situation where several layers of the radar attenuating paint are used, the resulting attenuation will depend upon the number of layers, their separation distances and upon the separation from the conductive substrate, if the latter is used. The utilization of the radar attenuating paint composition of the present invention provides for the application of a radar attenuating material in relatively thin, lightweight layers which provides for ready application to highly mobile tactical, groundbased weapon systems. The radar attenuating paint of the present invention may also be used in a variety of circumstances such as on strategic systems, stationary tactical systems such as forward-base airfields, airborne systems, water-based systems, and satellites.

In accordance with the present invention, it has been determined that upon the addition of dipole segments in the form of conductive fibers, such as stainless steel and/or carbon or graphite fibers, into a paint composition that a radar attenuating paint is produced which is capable of absorbing and/or scattering incident microwave radiation causing a significant decrease in the retroreflection. Paints utilized are standard Army camouflage paints to which the attenuating material is added. The conductive fibers, such as the steel and/or carbon or graphite fibers, are dipole segments whereby electromagnetic fields induced by interacting microwave radiation, interact coherently with each other to result in absorption and scattering of the incident radiation. The absorption process is enhanced due to the high permeability of the segment matrix material. By varying the lengths of the segments, the effective band width for attenuation can be relatively broadened. The optimum attenuated radar frequency corresponds to the average length of the segments and the effective band width corresponds to the distribution in segment lengths. The quantity of segments present in the radar attenuating paint will be determined by the radar frequency, the effective band width and the required attenuation. The segments in the paint composition are spaced apart from a small fraction of radiation wavelength to several wavelengths. The radar attenuating paint composition of the present invention may be used on the surfaces of military targets for the purpose of protecting them; from being detected, located, and/or recognized by radar with frequencies of 5 to 100 GHz and with a finite band width and ranges greater than two kilometers. These results are realized at concentrations substantially less than of those materials heretofore considered for use as radar attenuating materials.

DETAILED DESCRIPTION

In accordance with the present invention, a conductive fiber, such as a stainless steel or graphite fiber, is introduced into a paint composition in the form of dipole segments. The segments are added to the paint composition generally at varying lengths so as to increase the frequency band or band width of the radar which can be effectively attenuated. The optimum attenuated radar frequency corresponds to the average length of the segments and the effective band width corresponds to the distribution in segment lengths. The corresponding ratio of the length of the dipole to the diameter of the segment will generally be about 1000 to 1. Therefore, the length of the segment will range from about 0.001 cm (10 microns) to about 3 cm ($3 \times 10^4$ microns) with a preferred length ranging from about 0.1 cm ($10^3$ microns) to 1.0 cm ($10^4$ microns). The diameter of the segment will range from $10^{-6}$ cm (0.01 micron) to 0.003 centimeters (30 microns) with a preferred range being from about $10^{-4}$ centimeters (1 micron) to $15 \times 10^{-4}$ centimeters (15 microns). The segments of the composition are spaced at an average distance of $\frac{1}{2}$ to 2 times the wavelength of the radiation of interest to effect coherent absorption and scattering of the radiation. Thus, the type of radar attenuating paint of the present invention would provide for the absorption and/or scattering of incident microwave radiation, causing significant decrease in retroreflectance or reduction in the radar cross-section. Radar cross-section is the result of retroreflection of the microwave radiation incident on a target, that is, some of the radiation is reflected directly back to the radar antenna. The goal or purpose of a countermeasure is to reduce the microwave radiation reflected back by the target to the receiver, thus reducing the radar cross-section or the amount of retroreflection. This goal is achieved if the incident microwave radiation is either absorbed and/or scattered by the countermeasure. The field interaction produced by the metallic segments of the present invention accomplishes these results.

The quantity of the metallic or stainless steel, and/or graphite fibers present in the paint composition will be from about 0.10 to 5% of the weight of the radar attenuating paint composition with the quantity being determined by the radar frequency to be attenuated and the effective band width of the resulting paint composition. Obviously, the quantity of conductive fiber present will have a bearing on the spatial relationship between the respective segment within the resulting radar attenuating paint.

Any suitable conductive fiber may be used in accordance with the present invention. Typical conductive fibers which satisfy the requirements of electric segments include stainless steel fibers, nickel fibers, and carbon or graphite fibers. The metallic fibers of the present invention are introduced into conventional Army camouflage paints including a polyurethane binder and suitable pigments. Standard or conventional Army paints consist of a binder, such as polyurethane, in which is mixed a small concentration of about seven pigments so that the resultant color matches the natural background for visual wavelengths. Other binders such as alkyd and epoxy can be employed. For practical reasons it is preferred that paint-layer thickness not exceed 250$\mu$, thinner layers being preferable.

As stated above, the density of the segment particles in the paint composition is selected to establish an average or effective spacing between adjacent particles within the range of $\frac{1}{2}$ to twice the wavelength of the radiation to be defeated to achieve the desired absorption and scattering effect. For example, the number density of segments having a length of 0.15 cm is selected to be 400 per cm$^2$ to provide an attenuation of the millimeter wave radiation of a frequency of 100 GHz in the order of 10 db. If the dipole density is increased above the optimum range, the resulting dispersement of dipoles tends to increasingly resemble a solid film of electrically conductive material and will reflect instead of attenuate the incident radiation.

Radiation in the millimeter wave range and generally used as radar for the instant application is generated by systems so as to be reflected by a target and the sensed reflected radiation used to direct a homing missile to strike the detected target. There are four frequencies of interest within the millimeter wave range which are used in such missile guidance systems, that being 35$\pm$1 GHz, 94$\pm$1 GHz, 140$\pm$1 GHz, and 220$\pm$1 GHz. To defeat detection of a target by millimeter wave radiation, relatively small conductive particles forming electric segments are disposed in the paint composition whereby the millimeter wave radiation striking and being reflected by a target to which the paint composition containing the segments has been applied is effectively attenuated, that is, coherently absorbed and scattered by the segments in the radar attenuating paint of the present invention. As indicated above, electrically conductive particles are configured in dimension to form dipole segments wherein their length is made approximately $\frac{1}{2}$ the wavelength or less of the above noted frequencies of the microwave radiation, that is for $l=\frac{1}{2}\lambda$ the segments are formed of lengths of 0.428, 0.160, 0.107, and 0.068 cm corresponding to these frequencies.

Radiation in the radar range, and in particular, in the X-band is used to detect military targets, and segments similar to those described above to defeat millimeter wave radiation are mixed in the Army camouflage paint composition. If the principle radar frequency of interest in this instance is 10 GHz, the $\frac{1}{2}$ wavelength segments present have a length of 1.5 cm or less. By suitably spacing the dipole segments from each other, it is contemplated that an attenuation of approximately 10–20 db of radar radiation can be effected.

The radar attenuating paint may effectively be placed directly on an electrically conductive substrate, for example, a tank, the resulting attenuation depending on the type of fiber or dipole segment, carbon or graphite being preferred, or it may be placed on a dielectric substrate, such as a soldier's uniform. The distance between a conductive substrate and the radar attenuating paint layer will affect the resulting attenuation. In the situation where several layers of the radar attenuating paint are used, the resulting attenuation will depend upon the number of layers, the distances between the layers, and upon the separation from the conductive substrate. The radar attenuating paint of the present invention provides for the application of a radar countermeasure to be made of one or more relatively thin, lightweight layers which can be used on highly mobile tactical groundbased weapon systems. The paint is further useful on strategic systems, stationary tactical systems, airborne systems, water-based systems and satellites.

In application, a layer of paint may be applied to a flat surface in such a way that the conductive fiber segments are parallel to the flat surface. With the segments having a length $l_1$ corresponding to a radar wavelength $\lambda_1$ then the segments may be applied to the flat surface in such a way that they are parallel to the suface but otherwise randomly distributed with respect to each other. In the alternative, the segments may be applied so that they are parallel to both the flat surface and to each other. In this latter case, a second layer could be formed similar to the first layer but with the segments perpendicular to those in the first layer. In all cases, the centroids of each segment would be separated from those of neighboring segments by one-half of a wavelength to 2 wavelengths. Either formation will effectively attenuate a corresponding frequency at $\lambda_1$. For a different frequency, the parameters, would be $l_2$ and $\lambda_2$, and so on. Thus, a number of different frequencies can be attenuated by the same number of attenuating layers.

The inventive paint or coating compositions are further illustrated by the following examples:

EXAMPLE 1

Stainless steel (SS-316) fibers were mixed in an epoxy binder in various percentages between 1% and 7%, for example in a 5% by weight concentration. The fibers were 2000$\mu$ in length and 8$\mu$ in diameter. The mixture was painted on a flat dielectric surface (cloth) in a paint layer thickness of 75$\mu$. Attenuation characteristics were measured by impinging radiation normally from a 100 GHz radar having a wavelength of about 3000$\mu$ upon the dried painted surface of the thin flat dielectric material (cloth) with the paint on the side facing the radar. The intensity of the microwave radiation reflected from the painted surface was measured and compared with the measured intensity of the transmitted impinging radiation and the resulting attenuation was determined. A flat conductive backing plate was placed on the side of the sample away from the radar and parallel to the sample. Attenuation of the radiation varied upon movement of the backing plate away from the sample with the maximum of 12 db measured at a distance of about one half wavelength or about 0.15 cm. Attenuation remained significant with the conductive backing plate at distances both closer and farther from the sample. The attenuation of the cloth and the paint binders without the dipole fiber segments is negligible. Also the attenuation of the paint binders without the fibers is negligible.

EXAMPLE 2

A variety of graphite, stainless steel, and other conducting fibers at lengths of 0.1–0.8 cm and diameters of 2–8 microns were tested also in small weight percentages in standard Army military camouflage paint having a polyurethane binder and various pigments. In various tests at 100 GHz carried out according to the procedure of Example 1, above, maximums of 10–12 db attenuation were achieved. Commercially available carbon fibers having resistivities varying between 5$\mu$-ohm per meter and 18$\mu$-ohm per meter, diameters from 2$\mu$ to 6$\mu$, and lengths from 1.5 mm to 4 mm were tested in the paint compositions. The application of interest is more particularly using thin radar-absorbing coatings on thin dielectric substrates, including camouflage cloth.

Those skilled in the art will have other modifications occur to them based upon the teachings of the present invention. These modifications are intended to be encompassed within the scope of the invention and the following claims.

I claim:

1. A radar attenuating paint composition for absorbing and scattering incident microwave radiation producing a significant decrease in retroflectance comprising a binder composition having uniformly dispersed therein a plurality of dipole segments made of electrically conductive fibers spatially arranged so as to effect coherent absorption and scattering of said radiation wherein said electrically conductive segments range in length from 0.001 to 3 cm and in diameter of from $1 \times 10^{-6}$ to $3 \times 10^{-3}$ cm, and wherein said dipole segments are present in an amount ranging from about 0.1 to 5.0% of said radar attenuating paint composition, by weight.

2. The radar attenuating paint composition of claim 1 wherein said segments range in length from 0.1 to 1.0 cm and said diameter ranges from 0.0001 to 0.001 cm.

3. The radar attenuating paint composition of claim 1, wherein said segments are made of stainless steel fibers.

4. The radar attenuating paint composition of claim 1, wherein said segments are made of carbon fibers.

5. The radar attenuating paint composition of claim 4, wherein said carbon segments are graphite.

6. The radar attenuating paint composition of claim 1, wherein said segments are of varying lengths.

7. The radar attenuating paint composition of claim 1, wherein said plurality of segments are spaced from each other at an effective distance within the range of one-half to two times the wavelengths of the particular radar being attenuated.

8. The radar attenuating paint composition of claim 1, wherein the lengths of said segments are about one-half the wavelength of first and second wavelengths of incident radiation.

9. The radar attenuating paint composition of claim 1, wherein the binder is selected from the group consisting of polyurethanes, alkyds and epoxys.

* * * * *